(12) United States Patent
Moradnia

(10) Patent No.: US 12,715,274 B2
(45) Date of Patent: Aug. 25, 2026

(54) SIDE DOOR FOR A VEHICLE

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 18/403,524

(22) Filed: Jan. 3, 2024

(65) Prior Publication Data

US 2025/0214402 A1 Jul. 3, 2025

(51) Int. Cl.
*B60J 5/04* (2006.01)
*B60J 10/79* (2016.01)

(52) U.S. Cl.
CPC ............. *B60J 5/0402* (2013.01); *B60J 10/79* (2016.02)

(58) Field of Classification Search
CPC ....... B60J 1/085; B60J 1/10; B60J 1/12; B60J 1/17; B60J 5/0402; B60J 10/79
USPC ........................................... 296/146.2, 146.3
See application file for complete search history.

(56) References Cited

U.S. PATENT DOCUMENTS 4,034,509 A * 7/1977 DeRees ................. E05F 11/445 49/353
4,988,142 A * 1/1991 Chandler ................. B60J 10/79 49/502
5,829,195 A 11/1998 Ojanen
7,845,713 B2 12/2010 Terai et al.
8,205,930 B1 * 6/2012 Zhang .................... B60J 5/0487 296/146.1
9,335,021 B2 5/2016 Massault et al.
9,871,199 B2 1/2018 Schwenke et al.
10,737,638 B2 8/2020 Tanaka et al.
11,312,292 B2 4/2022 Kleo et al.
11,731,494 B2 * 8/2023 Slack ..................... B60J 5/0402 296/146.2

FOREIGN PATENT DOCUMENTS

CN 101070078 B 7/2011
DE 940205 C 3/1956
DE 1985491 U 5/1968
DE 7439865 U 3/1976
DE 102017124228 B4 10/2022
JP 2005053400 A 3/2005

* cited by examiner

*Primary Examiner* — Jason S Daniels
(74) *Attorney, Agent, or Firm* — Morgan Lincoln; American Honda Motor Co., Inc.

(57) ABSTRACT

A side door for a vehicle and arranged between an A-pillar and a B-pillar of the vehicle includes a door body defining a window opening extending from a front end of the door body to a rear end of the door body. The side door also includes a first glass arranged inside the window opening and is disposed proximately to an associated A-pillar. The side door further includes a second glass movably arranged inside the window opening and extending rearwardly from the first glass. The first glass and the second glass are mounted to the door body such that an outer surface of the first glass is arranged flush with an outer surface of the door body and an outer surface of the second glass is arranged inwardly of the outer surface of the first glass defining a step therebetween.

20 Claims, 3 Drawing Sheets

SIDE DOOR FOR A VEHICLE

BACKGROUND

The disclosed subject matter relates generally to a vehicle. More particularly, the disclosed subject matter relates to a side door for a vehicle having a glass arranged inside a portion of a window opening and having an outer surface arranged flush with an outer surface of A-pillar of the vehicle.

Most current vehicles have a "step" moving from A-pillar to a side window, which separates airflow at this point and creates a vortical structure causing increased drag.

SUMMARY

In accordance with one embodiment of the present disclosure, a side door for a vehicle and adapted to be arranged between an A-pillar and a B-pillar of the vehicle is disclosed. The side door includes a door body defining a window opening extending from a front end of the door body to a rear end of the door body. The side door also includes a first glass arranged inside the window opening and coupled to the door body. The first glass extends from the front end of the door body towards the rear end and is adapted to be disposed proximately to an associated A-pillar. The side door further includes a second glass movably arranged inside the window opening and extending rearwardly from the first glass. The first glass and the second glass are mounted to the door body such that an outer surface of the first glass is arranged flush with an outer surface of the door body and an outer surface of the second glass is arranged inwardly of the outer surface of the first glass defining a step therebetween.

In accordance with another embodiment of the present disclosure, a vehicle is disclosed. The vehicle comprised a vehicle body having a pair of A-pillars and a pair of B-pillars, and a pair of side doors pivotally coupled to the vehicle body and arranged between the pair of A-pillars and the pair of B-pillars. Each of the pair of side doors includes a door body defining a window opening extending from a front end of the door body to a rear end of the door body, and a first glass arranged inside the window opening and coupled to the door body. The first glass extends from the front end of the door body towards the rear end and is disposed proximately to an associated A-pillar. The side door also includes a second glass movably arranged inside the window opening and extending rearwardly from the first glass. The first glass and the second glass are mounted to the door body such that an outer surface of the first glass is arranged flush with an outer surface of the A-pillar and an outer surface of the second glass is arranged inwardly of the outer surface of the first glass defining a step therebetween.

In accordance with yet a further embodiment of the present disclosure, a vehicle is disclosed. The vehicle comprises a vehicle body having a pair of A-pillars and a pair of B-pillars and a pair of side doors pivotally coupled to the vehicle body and arranged between the pair of A-pillars and the pair of B-pillars. Each of the pair of side doors includes a door body defining a window opening extending from a front end of the door body to a rear end of the door body, and a first glass arranged inside the window opening and fixedly coupled to the door body covering a portion of the window opening. The first glass extends from the front end of the door body towards the rear end and is disposed proximately to an associated A-pillar. The side door also includes a second glass movably arranged inside the window opening and extending rearwardly from the first glass. The first glass and the second glass are mounted to the door body such that an outer surface of the first glass is arranged flush with an outer surface of the A-pillar and an outer surface of the second glass is arranged inwardly of the outer surface of the first glass defining a step therebetween.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-3, wherein like numbers indicate the same or corresponding elements throughout the views.

Figure 1:
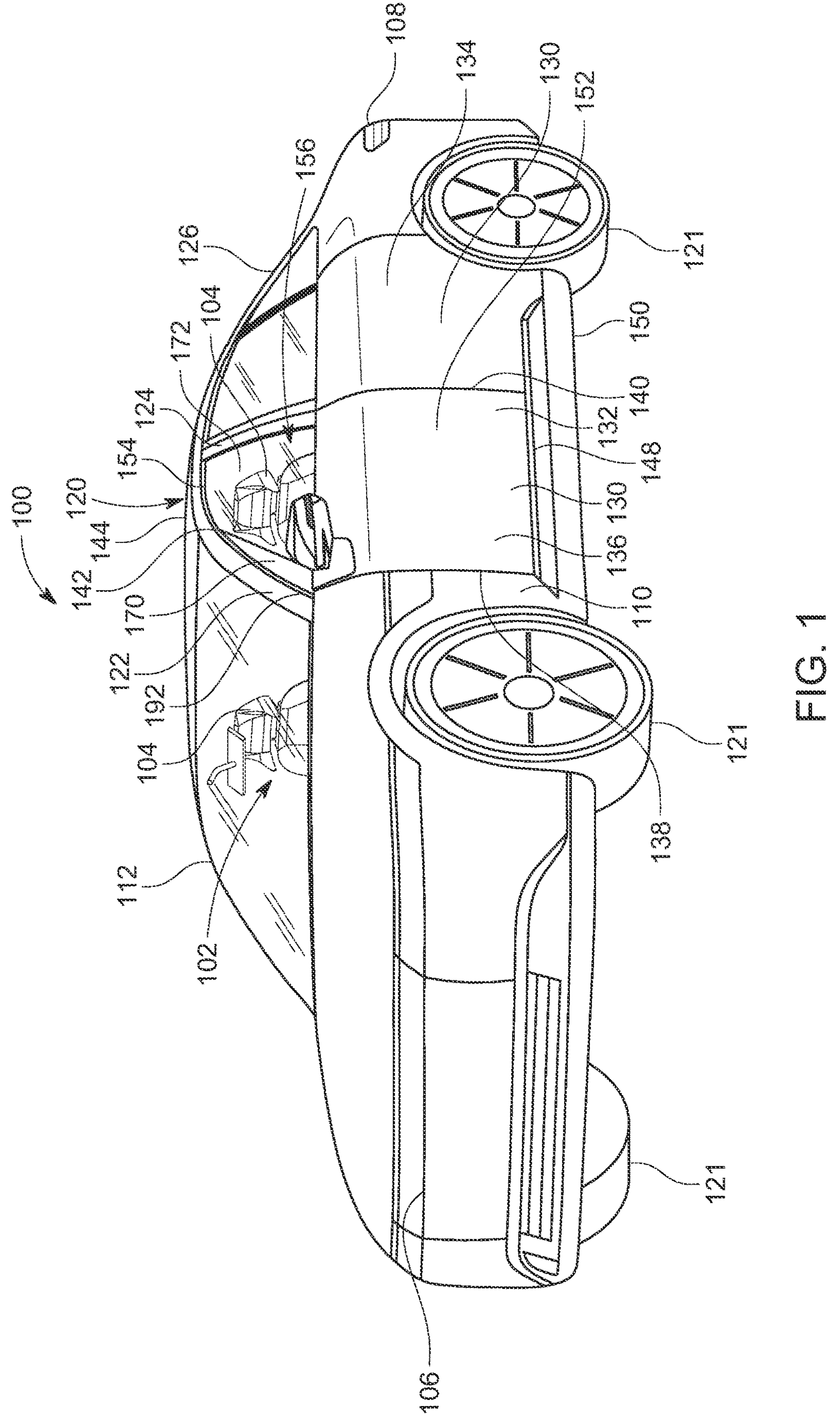
FIG. 1 is a perspective view of a vehicle having a side door, in accordance with one embodiment of the present disclosure.

FIG. 1 illustrates a perspective view of a vehicle 100, in accordance with one embodiment of the present disclosure. The vehicle 100 is shown as a sedan having a passenger compartment 102 having a plurality of seats 104 to facilitate a seating of one or more passengers inside the vehicle 100. However, the vehicles 100 in accordance with alternative embodiments can comprise any variety of vehicles, including multi-utility vehicles, sport utility vehicles, jeeps, truck, hatchback, etc., for example. The vehicle 100 includes a front end 106, a rear end 108, a first longitudinal side 110 (hereinafter referred to as a left side 110), a second longitudinal side 112 (hereinafter referred to as a right side 112), and a vehicle body 120 extending from the front end 106 to the rear end 108 and supported on a plurality of wheels 121.

As shown in FIG. 1, the vehicle body 120 defines the passenger compartment 102 and includes a plurality of pillars, for example, A-pillars 122, B-pillars 124, and C-pillars 126 defining access openings of the passenger compartment 102. Further, the vehicle 100 includes a plurality of side doors 130 pivotally coupled to the vehicle body 120 and arranged on the longitudinal sides 110, 112 of the vehicle 100 and adapted to move between an open position and a closed position. In the open position, the side doors 130 are arranged away from the access openings, while in the closed position, the side doors 130 are arranged covering the access openings. The plurality of side doors 130 includes a pair of front side doors 132 that are arranged between the A-pillars 122 and the B-pillars 124, and a pair of rear side doors 134 that are disposed between the B-pillars 124 and the C-pillars 126.

Figure 2:
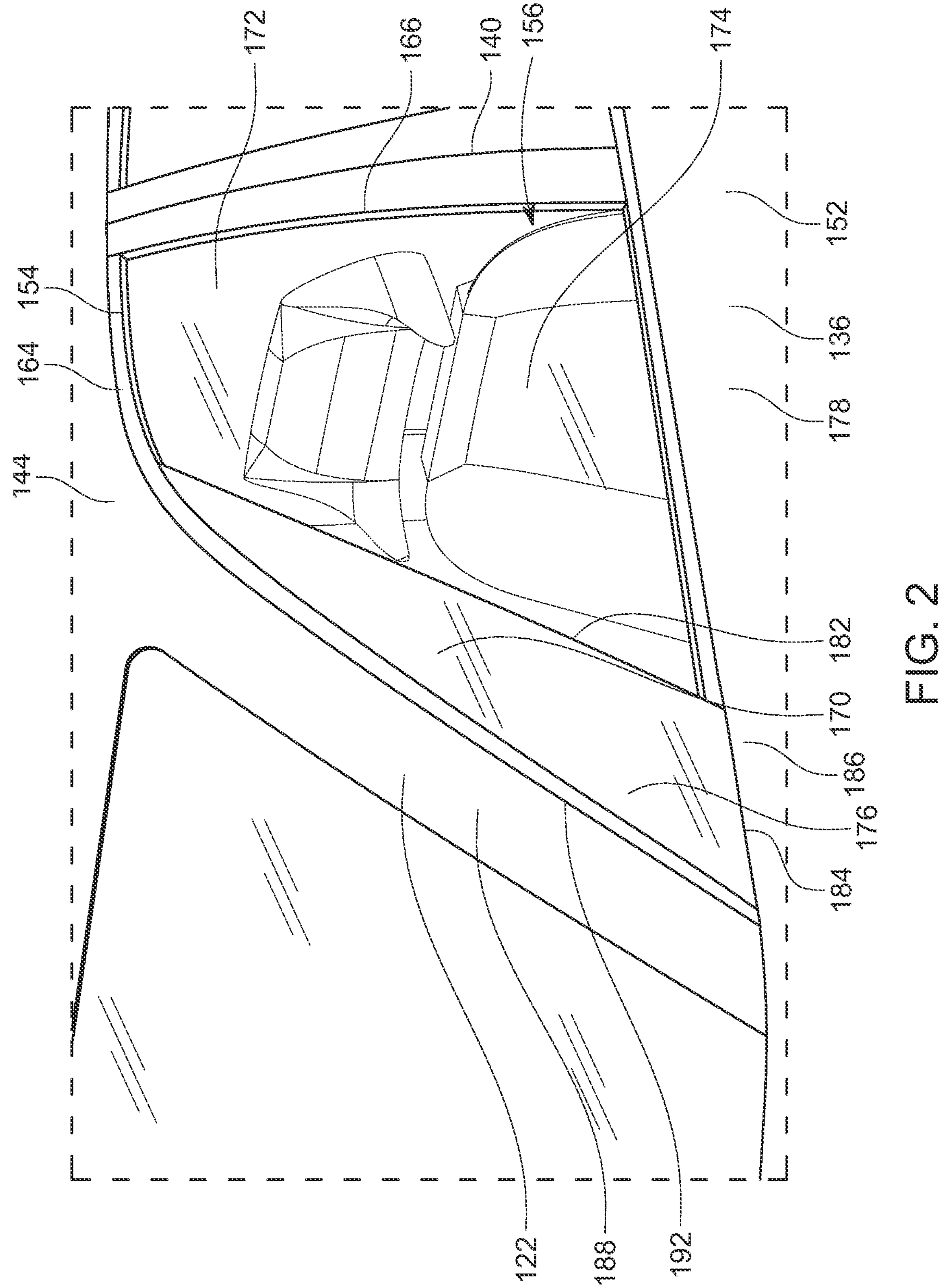
FIG. 2 is an enlarged view of a portion of the side door having a window opening with a first glass and a second glass arranged covering the window opening, in accordance with one embodiment of the present disclosure.
Figure 3:
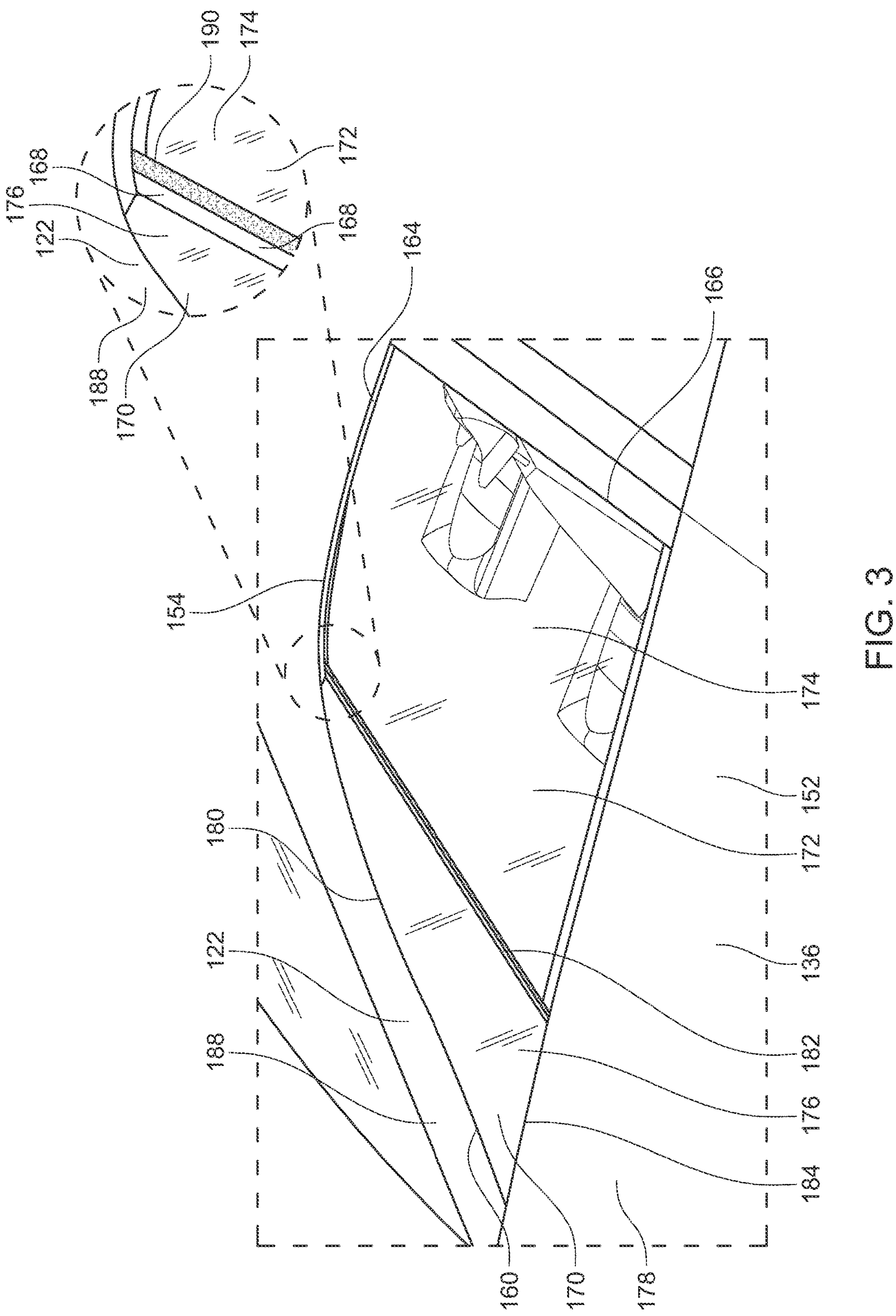
FIG. 3 is an enlarged perspective view of a portion of the side door of the vehicle of FIG. 1 depicting a step between the first glass and the second glass with trim removed from the side door, in accordance with one embodiment of the present disclosure.

It may be appreciated that the front side doors 132 are similar in structure, construction, and assembly, and therefore, for sake of clarity and brevity, the structure, construction, and assembly of only one front side door 132 (hereinafter simply referred to as side door 132) is explained in detail. As shown, the side door 132 includes a door body 136 having a front end 138 arranged proximate to the A-pillar 122, a rear end 140 arranged proximate to the B-pillar 124, a top end 142 arranged proximate to a roof 144 of the vehicle body 120, and a bottom end 148 disposed proximate to a floor 150 of the vehicle body 120. As shown, the door body 136 includes a door frame 152 extending from the bottom end 148 towards the top end 142 and a window sash 154 coupled to the door frame 152 and extending vertically upwardly from the door frame 152 to the top end 142 and defining a window opening 156 therebetween. As shown in FIGS. 2 and 3, the window sash 154 includes a front portion 160 (shown in FIG. 3) that extends along the A-pillar 122 in a curved manner, an upper portion 164 that extends along the roof 144 and a rear portion 166 that extends along the B-pillar 124 when the side door 132 is arranged in the closed position. Although, the door body 136 having the window sash 154 is shown and contemplated, it may be envisioned that window sash 154 may be omitted and the door 132 is sash-less door.

Further, referring to FIGS. 2 and 3, the side door 130 includes a first glass 170 and a second glass 172 arranged inside the window opening 156 and coupled to the door body 136. As shown, the front glass 170 is arranged to cover a front portion of the window opening 156 and extends rearwardly from the front portion 160 of the window sash 154, while the second glass 172 is arranged to cover a rear portion of the window opening 156 and extends rearwardly from the first glass 170 to the rear portion 166 of the window sash 154. Accordingly, the first glass 170 extends rearwardly from the front end 138 of the door body 136 and the second glass 172 extends from the first glass 170 to the rear end 140 of the door body 136. Further, as shown, an outer surface 174 of the second glass 172 is arranged inwardly in a lateral direction and at an offset from an outer surface 176 of the first glass 170. Accordingly, a step 168 (shown in FIG. 3) is defined at an interface of the first glass 170 and the second glass 172. It may be appreciated that the second glass 172 is movably coupled to the door body 136 i.e., door frame 152 and is adapted to be displaced between an open position and a closed position.

The first glass 170 is arranged such that a first edge 180 (shown in FIG. 3) of the first glass 170 extends along the front portion 160 of the window sash 154 and a second edge 182 extends in a vertical direction from the door frame 152 towards the top end 142 of the door body 136 and unto the upper portion 164 of the window sash 154. Further, the first glass 170 includes a third edge i.e., a lower edge 184 that may extend in a longitudinal direction of the vehicle and connects the first edge 180 to the second edge 184 and extends along an upper edge of the door frame 152. Moreover, as shown the second edge 182 of the first glass 170 is arranged at an inclination to the lower edge 184 and may define an obtuse angle therebetween. In some embodiments, the second edge 182 may be arranged substantially perpendicularly to the lower edge 184 of the first glass 170. Also, it may be envisioned that the first glass 170 is engaged to the door body 136 such that the outer surface 176 of the first glass 170 is arranged flush with an outer surface 178 of the door body 136 and with an outer surface 188 of the A-pillar 122.

In the illustrated embodiment, the first glass 170 is fixedly attached to the door body 136, covering a front portion of the window opening 156. Alternatively, the first glass 170 is movably attached to the door body 136 and adapted to move between an open position and a closed position. In the closed position, the first glass 170 is arranged covering a portion of the window opening 156, while in the open position, the first glass 170 is arranged away from the window opening 156. In such a case, it may be understood that the arrangement of the first glass 170 with respect to the door body 136 and the vehicle body 120 is described when the first glass 170 is arranged in the closed position. It may be appreciated that the step 168 is defined when both the first glass 170 and the second glass 172 is arranged in the closed position, covering the window opening 156.

To prevent a leakage of the water from outside of the vehicle 100 to an interior of the vehicle 100, through any gap that may exist between the first glass 170 and the second glass 172, the side door 132 includes a seal 190 (shown in FIG. 3) arranged at an interface of the first glass 170 and the second glass 172 and may be coupled to the second edge 182 of the first glass 170. Also, the seal 190 extends along the second edge 182 and may contact the step 168 and the outer surface 174 of the second glass 172. In some embodiments, the side door 132 may include a trim 192 (shown in FIGS. 1 and 2) coupled to either the A-pillar 122 or the side door 132. The trim 192 extends along the first edge 180 of the first glass 170 and follows the contour of the A-pillar 122 to the first glass 170 to provide a smooth transition surface for the air flow.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A side door for a vehicle and adapted to be arranged between an A-pillar and a B-pillar of the vehicle, the side door comprising:

a door body defining a window opening extending from a front end of the door body to a rear end of the door body;

a first glass arranged inside the window opening and coupled to the door body, wherein the first glass extends from the front end of the door body towards the rear end and is adapted to be disposed proximately to an associated A-pillar; and a second glass movably arranged inside the window opening and extending rearwardly from the first glass, wherein the first glass and the second glass are mounted to the door body such that an outer surface of the first glass is arranged flush with an outer surface of the door body and an outer surface of the second glass is arranged inwardly of the outer surface of the first glass defining a step therebetween.

2. The side door of claim 1, wherein the first glass is movably coupled to the door body adapted to be displaced between an open position and a closed position, wherein in the closed position, the first glass covers a portion of the window opening.

3. The side door of claim 1, wherein the first glass is fixedly attached to the side door covering a portion of the window opening.

4. The side door of claim 1, wherein the first glass includes a first side edge adapted to extend along the associated A-pillar, a second side edge arranged proximate to the second glass, and a lower edge connecting the first side edge to the second side edge, wherein the step is defined between the second side edge of the first glass and an outer surface of the second glass.

5. The side door of claim 4, wherein the second side edge extends substantially perpendicular to the lower edge.

6. The side door of claim 4, wherein, the second side edge extends at an obtuse angle relative to the lower edge.

7. The side door of claim 1 further including a trim extending along the first side edge and adapted to follow a contour of an outer surface of the associated A-pillar.

8. The side door of claim 1 further including a seal arranged between the first glass and the second glass and extending along the second side edge of the first glass.

9. A vehicle, comprising:

a vehicle body having a pair of A-pillars and a pair of B-pillars; and a pair of side doors pivotally coupled to the vehicle body and arranged between the pair of A-pillars and the pair of B-pillars, each of the pair of side doors includes a door body defining a window opening extending from a front end of the door body to a rear end of the door body, a first glass arranged inside the window opening and coupled to the door body, wherein the first glass extends from the front end of the door body towards the rear end and is disposed proximately to an associated A-pillar, and a second glass movably arranged inside the window opening and extending rearwardly from the first glass, wherein the first glass and the second glass are mounted to the door body such that an outer surface of the first glass is arranged flush with an outer surface of the A-pillar and an outer surface of the second glass is arranged inwardly of the outer surface of the first glass defining a step therebetween.

10. The vehicle of claim 9, wherein the first glass is movably coupled to the door body adapted to be displaced between an open position and a closed position, wherein in the closed position, the first glass covers a portion of the window opening.

11. The vehicle of claim 9, wherein the first glass is fixedly attached to the side door covering a portion of the window opening.

12. The vehicle of claim 9, wherein the first glass includes a first side edge adapted to extend along the associated A-pillar, a second side edge arranged proximate to the second glass, and a lower edge connecting the first side edge to the second side edge, wherein the step is defined between the second side edge of the first glass and an outer surface of the second glass.

13. The vehicle of claim 12, wherein the second side edge extends substantially perpendicular to the lower edge.

14. The vehicle of claim 12, wherein, the second side edge extends at an obtuse angle relative to the lower edge.

15. The vehicle of claim 9 further including a trim extending along the first side edge and adapted to follow a contour of an outer surface of the associated A-pillar.

16. A vehicle, comprising:

a vehicle body having a pair of A-pillars and a pair of B-pillars; and a pair of side doors pivotally coupled to the vehicle body and arranged between the pair of A-pillars and the pair of B-pillars, each of the pair of side doors includes a door body defining a window opening extending from a front end of the door body to a rear end of the door body, a first glass arranged inside the window opening and fixedly coupled to the door body covering a portion of the window opening, wherein the first glass extends from the front end of the door body towards the rear end and is disposed proximately to an associated A-pillar, and a second glass movably arranged inside the window opening and extending rearwardly from the first glass, wherein the first glass and the second glass are mounted to the door body such that an outer surface of the first glass is arranged flush with an outer surface of the A-pillar and an outer surface of the second glass is arranged inwardly of the outer surface of the first glass defining a step therebetween.

17. The vehicle of claim 16, wherein the first glass includes a first side edge adapted to extend along the associated A-pillar, a second side edge arranged proximate to the second glass, and a lower edge connecting the first side edge to the second side edge, wherein the step is defined between the second side edge of the first glass and an outer surface of the second glass.

18. The vehicle of claim 17, wherein the second side edge extends substantially perpendicular to the lower edge.

19. The vehicle of claim 17, wherein, the second side edge extends at an obtuse angle relative to the lower edge.

20. The vehicle of claim 16 further including a trim extending along the first side edge and adapted to follow a contour of an outer surface of the associated A-pillar.

* * * * *